Figure 1:
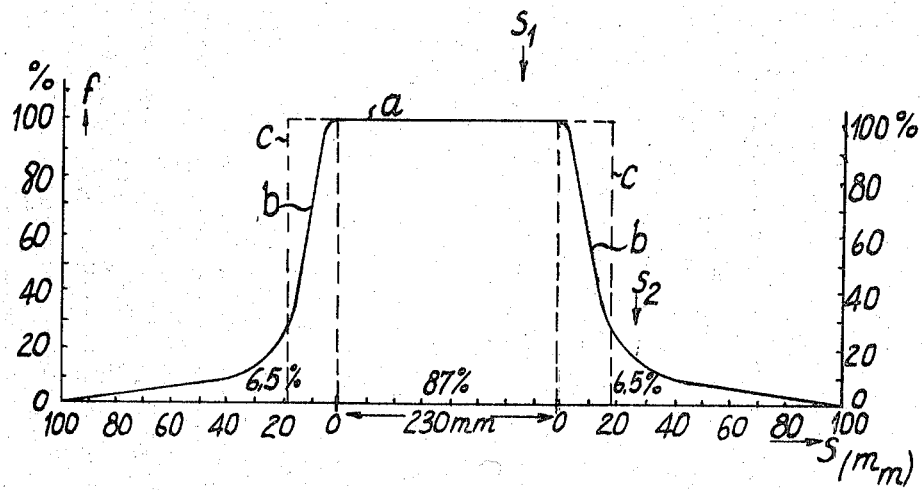

United States Patent

[11] 3,549,881

| [72] | Inventor | Kurt G. E. Kronenberger<br>Bremen, Germany |
|---|---|---|
| [21] | Appl. No. | 703,755 |
| [22] | Filed | Feb. 7, 1968 |
| [45] | Patented | Dec. 22, 1970 |
| [73] | Assignee | Varian Mat G.m.b.H.<br>Bremen, Germany<br>a Limited company |
| [32] | Priority | Feb. 8, 1967 |
| [33] | | Germany |
| [31] | | No. B91087 |

[54] MASS SPECTROMETER CONTROL SYSTEM USING HALL PROBES TO MEAUSURE AND REGULATE THE GAP AND STRAY FIELDS OF THE ANALYZING MAGNET
7 Claims, 2 Drawing Figs.

[52] U.S. Cl..................................... 250/41.9,
324/45
[51] Int. Cl...................................... H01j 39/34,
G01r 33/06

[50] Field of Search........................................250/41.9(R),
41.9(1), 41.9(2), 41.9(3), 41.9ISB,
41.9G; 324/45, (Inquired)

[56] References Cited
UNITED STATES PATENTS
| 3,323,057 | 5/1967 | Haley........................... | 324/45 |
| 3,244,876 | 4/1966 | Kanda et al................... | 250/41.9 |

*Primary Examiner*—Archie R. Borchelt
*Assistant Examiner*—E. E. Church
*Attorney*—Wolf, Greenfield & Sacks

ABSTRACT: The invention is directed to an arrangement for integral measurement of a magnetic field by use of a plurality of field sensing means arranged in a gap of a magnet producing the field and arranged in the stray field, the measuring values of the various sensing means being differently weighted.

INVENTOR
Kurt G.E. Kronenberger

MASS SPECTROMETER CONTROL SYSTEM USING HALL PROBES TO MEUASURE AND REGULATE THE GAP AND STRAY FIELDS OF THE ANALYZING MAGNET

BACKGROUND TO THE INVENTION

The invention relates to an arrangement for measuring magnetic fields, more particularly for the purpose of controlling the energizing current of mass separating electromagnets in mass spectrometers, by means of field sensing devices, especially using Hall probes as field sensing devices.

The known arrangements of this kind work with a field sensing device lying in the gap of the magnet and allow for the influence of the stray field by means of a constant calibration factor. The influence of the stray field is however not constant, but is e.g. influenced by temperature variations owing to the temperature dependent nature of the permeability of the iron of the magnet. Moreover, other magnitudes such as e.g. a remanence effect or eddy currents in the iron body can influence the ratio between the stray field strength and field strength at the gap of the magnet. To allow for this influence in the measurement, it is necessary to allow for the field strength in the gap of the separating magnet and in the stray field, in the correct proportion for the measurement. The known devices assume a constant relationship of the stray field strength to the field strength in the magnet gap and owing to unavoidable variations of this relationship, lead to measuring errors. With arrangements for controlling the magnet energizing current of separating magnets in mass spectrometers, this leads to displacement of the mass scale by field deformations, e.g. as a result of temperature fluctuations.

It is an object of the present invention to provide a device for measuring a magnetic field, which is arranged in such a way that possible deformations of the magnetic field are embraced by the field measurement, so that they have an influence on the measurement and thus cannot cause measuring error.

SUMMARY OF THE INVENTION

With the foregoing and other objects in view the present invention consists in a device for measuring a magnetic field, wherein a plurality of field sensing means are provided and are arranged in a gap of the magnet establishing the field and in the stray field, and the measuring values of the individual sensing means are provided with different weightings and are combined to form a sum value which is indicated by indicating means so as to serve as a measure for the integral action of the total magnetic field, or is used as a control magnitude for the energizing current of the magnet. In principle, the possible number of measuring probes is unlimited, but for reasons of expense as small a number of measuring probes as practicable should be used. An already very good accuracy of field measurement is achieved if in addition to a field sensing device in the gap of the magnet, a field sensing device is provided in the stray field (with separating magnets of mass spectrometers, for example in the stray field as the ion entry side).

For control of magnet current, a sum forming stage can be provided on the field sensing device arranged in the magnet field, for forming the sum voltage from the individual voltages of the field sensing devices, while in a following comparison stage, in known manner the different voltage between the said sum voltage and a comparison voltage determining the desired mass number is formed, and is supplied as a control voltage to the controller for the magnet current, after amplification. For adjusting its voltage contribution, the field sensing device provided in the stray field may be displaceable in the stray field. Instead of this, or in combination therewith, the field sensing device provided in the stray field may be connected to the sum forming stage through an adjustable voltage divider for adjusting its voltage proportion.

Figure 2:
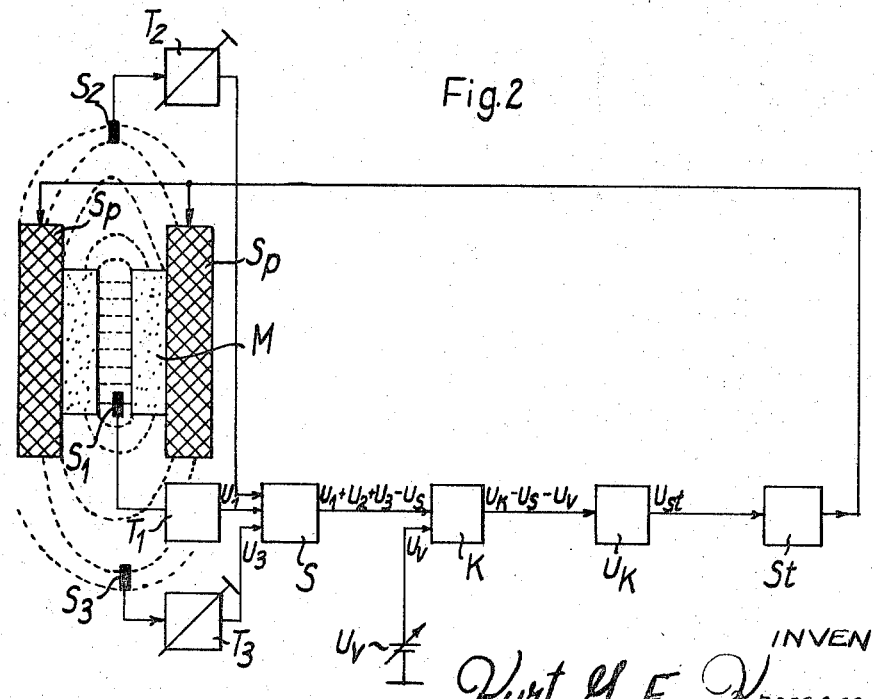

The above and other objects and advantages of the invention will be clear from the following description taken with reference to the accompanying drawings which are given by way of example and in which:

FIG. 1 shows the field distribution at the separating magnet of a mass spectrometer; and FIG. 2 is a diagram of a control arrangement for the energizing current of the separating magnet of a mass spectrometer, according to the invention.

The distribution of the field strength $f$ at the separating magnet of a mass spectrometer along the ion path $s$, as shown in FIG. 1, is essentially determined by the constant field strength $a$ in the gap of the separating magnet between its two pole shoes, and by the stray field $b$ outside the pole shoes. The length of the ion path between the pole shoes amounts in the illustrated example to 230mm. The stray fields outside the pole shoes act like extensions of the deflection path by in each case 17.5mm. or a total of 35mm. (with the gap field strength), as shown by the stray field substitution curve $c$. This means that in the spectrometer, 13 percent of the total deflection field acts outside the pole shoes as a stray field on the ions. The field distribution between the field strength $H_0$ in the gap and the stray field strength $H_{st}$ is not constant. It is for example influenced by temperature variations owing to the temperature-dependent coefficient of the iron permeability. From measurements, a displacement of the mass number 500 by 2.5 mass units was found to be caused for a temperature increase of the magnet from 33° C. to 55° C. This displacement of the mass scale, assuming a field distribution according to FIG. 1, corresponds to an increase of the quotient $H_{st}/H_0$ by 1.9 percent ($\Delta t = 22°$ C). As already explained above, other magnitudes such as for example a time dependent remanent effect or eddy currents in the iron bodies can also influence the ratio $H_{st}/H_0$.

From the above reasons, it would thus not be sufficient, for constructing a precision magnet current controller or a mass marking device for a mass spectrometer, to provide a single Hall probe as a field sensing device in the gap of the separating magnet; rather it is necessary to use a plurality of Hall probes, namely at least two, and to arrange these in the gap and in the stray field and to feed the Hall voltages into the controller in the proportions which correspond to the deflection action of the relevant field portions. For the above considered case, with two probes, the one in the gap would be evaluated with 87 percent contribution and the second one in the stray field with 13 percent contribution. If, as shown in the embodiment according to FIG. 2, three probes $S_1$, $S_2$ and $S_3$ are used, then the probe $S_1$ in the gap has to contribute 87 percent to the control action and the two probes $S_2$ and $S_3$ in the stray field have to contribute each 6.5 percent. The use of two probes $S_2$ and $S_3$ in the stray field has the advantage that nonsymmetry of the stray field can be allowed for.

The total field can be controlled with a probe arrangement according to FIG. 2 in such a way that with an alteration of the stray field ratio $H_{st}/H_0$, the ion deflection remains constant.

In the circuit according to FIG. 2 the voltage ratios $U_2/U_1$ and $U_3/U_1$ of the voltages derived from the probes $S_1$, $S_2$ and $S_3$ are adjusted to the desired compensation action by voltage dividers $T_1$, $T_2$ and $T_3$. In a sum forming stage S, the sum voltage $U_s = U_1 + U_2 + U_3$ is formed from the individual voltages of the field sensing devices $S_1$, $S_2$ and $S_3$. In a comparison stage K, in known manner the difference voltage $U_k$ between the sum voltage $U_s$ and a comparison voltage $U_r$ determined by the desired mass number is formed, and after amplification is fed as a control voltage $U_{st} = n \cdot U_k$ to the magnet current controller St, at the output of which the supply lines for the winding Sp of the separating magnet M are connected.

The voltage ratios $U_2/U_1$ and $U_3/U_1$ can alternatively be adjusted to the desired compensation action by displacing the probes $S_2$ and $S_3$ in the stray field, instead of by adjusting the dividers $T_1$, $T_2$ and $T_3$.

As an example, in FIG. 1, the necessary probe positions for the two probes $S_1$ and $S_2$ are shown for an arrangement with only two probes instead of three, and without using adjustment by means of dividers.

I claim:

1. Apparatus for providing an overall magnetic field signal representative of the integral action of the gap and stray magnetic fields produced by a mass separating magnet in a mass spectrometer upon ions traversing said stray and gap fields comprising:
   said magnet;
   gap field sensing means disposed in the gap of said magnet for providing a gap signal representative of the magnetic field in said gap;
   stray field sensing means disposed outside said gap near said magnet for providing a stray signal representative of said stray magnetic field; and
   means for combining said gap and stray signals to provide said overall magnetic field signal.

2. Apparatus in accordance with claim 1 wherein said means for combining includes means for differently weighting said gap and stray signals.

3. Apparatus in accordance with claim 1 and further comprising:
   a source of exciting current coupled to said magnet for establishing said gap and stray fields; and
   means for coupling said overall magnetic field signal to said source to control said exciting current so as to maintain said overall magnetic field signal at a predetermined value representative of a predetermined mass number.

4. Apparatus in accordance with claim 1 wherein said stray field sensing means comprises an outlet sensing means in the stray field at the ion outlet side of said magnet and an inlet sensing means at the ion inlet side of said magnet.

5. Apparatus in accordance with claim 3 and further comprising a source of a comparison signal representative of said predetermined mass number, and said means for coupling comprises means for differentially combining said comparison signal and said overall magnetic field signal to provide a control signal that is coupled to said source of exciting current to lessen the difference between said comparison signal and said overall magnetic field signal.

6. Apparatus in accordance with claim 1 wherein said stray field sensing means comprise a plurality of relatively displaceable field sensing devices.

7. Apparatus in accordance with claim 2 wherein said means for differently weighting comprise adjustable voltage dividers comprising means for coupling said gap and stray signals to said means for combining.